United States Patent
Yoo

(10) Patent No.: US 10,656,726 B2
(45) Date of Patent: May 19, 2020

(54) KIT FOR CONTROLLING MULTIPLE COMPUTERS AND USE THEREOF

(71) Applicant: Cheolyong Yoo, Yantai (CN)

(72) Inventor: Cheolyong Yoo, Yantai (CN)

(*) Notice: Subject to any disclaimer, the term of this patent is extended or adjusted under 35 U.S.C. 154(b) by 0 days.

(21) Appl. No.: 15/520,173

(22) PCT Filed: Aug. 21, 2015

(86) PCT No.: PCT/CN2015/087803
§ 371 (c)(1),
(2) Date: Apr. 19, 2017

(87) PCT Pub. No.: WO2016/062160
PCT Pub. Date: Apr. 28, 2016

(65) Prior Publication Data
US 2017/0308180 A1    Oct. 26, 2017

(30) Foreign Application Priority Data

Oct. 24, 2014  (KR) .................. 10-2014-0144618
Jul. 23, 2015  (CN) .................. 2015 1 0436143
Jul. 23, 2015  (CN) .................. 2015 2 0537727 U

(51) Int. Cl.
*G06F 3/038* (2013.01)
*G06F 3/02* (2006.01)
(Continued)

(52) U.S. Cl.
CPC ............ *G06F 3/0227* (2013.01); *G06F 3/023* (2013.01); *G06F 3/0231* (2013.01); *G06F 3/038* (2013.01); *G06F 13/4022* (2013.01)

(58) Field of Classification Search
CPC ...... G06F 3/0227; G06F 3/0231; G06F 3/038; G06F 3/023; G06F 13/4022
See application file for complete search history.

(56) References Cited

U.S. PATENT DOCUMENTS 9,065,574 B2 *   6/2015   Buch .................. H04H 20/22
2007/0132733 A1 * 6/2007   Ram .................. G06F 3/0227
                                                     345/163
(Continued)

*Primary Examiner* — Henry Tsai
*Assistant Examiner* — Christopher Daley
(74) *Attorney, Agent, or Firm* — Patent Office of Dr. Chung Park

(57) ABSTRACT

A kit for controlling multiple computers. The kit comprises computers, input devices, and a remote control. Each computer comprises a receiving device and a control device for processing an input signal and controlling the receiving device. Each input device comprises transmitter devices having different frequencies and channels, an input unit, and a control device for processing input and output signals and controlling the modules inside the input device. The remote control comprises transmitter devices having different frequencies and channels, channel selection keys for freely selecting among different channels, and a controller for processing an inputted input instruction signal and controlling the modules inside the remote control. Each of the computers is connected to the input devices by means of the remote control. A wireless mouse and a wireless keyboard are used to perform selective operations on any one of multiple computers, thereby facilitating user operations.

4 Claims, 9 Drawing Sheets

(51) Int. Cl.
*G06F 3/023* (2006.01)
*G06F 13/40* (2006.01)

(56) References Cited

U.S. PATENT DOCUMENTS

| | | | | |
|---|---|---|---|---|
| 2007/0297373 | A1* | 12/2007 | Saifullah | H04W 48/18 370/338 |
| 2008/0266247 | A1* | 10/2008 | Robideaux | G06F 3/0231 345/156 |
| 2011/0080342 | A1* | 4/2011 | Haren | G06F 3/038 345/163 |
| 2011/0134027 | A1* | 6/2011 | Tsao | G06F 3/038 345/156 |
| 2012/0040616 | A1* | 2/2012 | Brillhart | G06F 3/023 455/41.3 |
| 2014/0256257 | A1* | 9/2014 | Thangella | H04W 76/27 455/41.2 |
| 2015/0188617 | A1* | 7/2015 | Kuo | H04B 7/0602 375/295 |
| 2015/0212631 | A1* | 7/2015 | Dave | G06F 3/0416 345/173 |

* cited by examiner

FIG. 8

KIT FOR CONTROLLING MULTIPLE COMPUTERS AND USE THEREOF

CROSS-REFERENCE TO PRIOR APPLICATIONS

This application is a national Stage Patent Application of PCT International Patent Application No. PCT/CN2015/087803, filed on Aug. 21, 2015 under 35 U.S.C. § 371, which claims priority of Chinese Patent Applications 201510436143.1 and 201520537727.3 and Korean Patent Application No. 10-2014-0144618, filed on Jul. 23, 2015, Jul. 23, 2015 and Oct. 24, 2014, respectively, which are all hereby incorporated by reference in their entirety.

TECHNICAL FIELD

The present invention relates to kits which belongs to a control region of a computer, in particular, controls multiple computers and an application thereof.

DESCRIPTION OF THE RELATED ART

In general, in order to simultaneously focus even a wireless keyboard on a computer desired by a user just by manipulating a channel selection button positioned in a wireless mouse, a separate receiving unit sensing a motion of the wireless mouse needs to be installed in the wireless keyboard and since the receiving unit of the wireless keyboard needs to continuously keep an eye on the motion of the wireless mouse, the receiving unit of the wireless keyboard needs to maintain "Standby Mode".

However, when the receiving unit of the wireless keyboard maintains the "Standby Mode", in the wireless keyboard which operates with a battery, a battery consumption problem occurs, and as a result, it is impossible to use the wireless keyboard for a long time.

In order to solve the impossibility in using the wireless keyboard for a long time, a method that can use the wireless keyboard for a long time without a separate receiving unit that senses the motion of the wireless mouse has been contrived.

In order to achieve such a purpose, the wireless mouse and the wireless keyboard operate independently from each other to allow the wireless mouse and the wireless keyboard to enter 'WakeUp Mode" while in use and enter "Sleep Mode" while not in use without the "Standby Mode" in which the battery is consumed largely.

In order to improve the existing technology, the present invention provides a kit which can control multiple computers and an application thereof.

According to the present invention, multiple computers can be manipulated by one wireless keyboard and one wireless mouse to save a space and cost and the wireless mouse and the wireless keyboard can be simultaneously used by the channel selection button to provide convenience to the user.

According to the present invention, the wireless mouse and the wireless keyboard may be used in physical network separation dual computers which may fundamentally prevent a problem hacked through the Internet and a notebook and a desktop computer may be used with one wireless mouse and one keyboard.

In order to solve the technical problem, the following technology is implemented in the present invention.

In the present invention, kit 1 controlling multiple computers, comprising:

n computers;
m input devices; and
one remote controller,
wherein each computer includes a receiving unit having different frequency channels for each channel and a control unit controlling input signal processing and the corresponding receiving unit, each input device includes n transmitting units having different frequency channels, an input unit, and a control unit controlling input/output signal processing and modules in the input device, the remote controller includes n transmitting units having different frequency channels, n channel selection buttons to select the respective channels, and a control unit R controlling the input signal processing and the modules in the remote controller, and a computer selected among n computers and m input devices are connected through the remote controller, a receiving unit i of a arbitrary computer i, a arbitrary transmitting unit i of the remote controller, and arbitrary transmitting units i in m input devices have the same frequency channel, and n and m among are the same as or different from each other and i is equal to or smaller than n.

In the above kit 1, kit 2 controlling multiple computers, wherein each computer among n computers additionally includes a transmitting unit A having the same frequency channel and each input device among m input devices additionally includes a receiving unit A having the same frequency, and among them, the transmitting units A of n computers and the receiving units A of m input devices have the same frequency channel and the control unit of the computer transfers a signal processed by the computer to the receiving unit A of the input device through the transmitting unit A.

The above kit 1 controlling multiple computers, wherein the kit controlling the multiple computers and an application thereof execute the following processes when a user presses the arbitrary channel selection button i with the remote controller, in process 1, the transmitting unit i of the remote controller transmits an activation command to the receiving unit i of the computer i, in process 2, when the control unit i of the computer i that receives the activation command through the receiving unit i of the computer i in process 1 receives input signals from m input devices, the control unit i transmits the input signals to the computer i, in process 3, each transmitting unit of the remote controller other than the transmitting unit i of the remote controller transmits a deactivation command to the corresponding receiving unit of each computer, and in process 4, the corresponding control unit that receives the deactivation command from the corresponding receiving unit of each computer in process 3 disregards the respective input signals received from m input devices.

The above kit 2 controlling multiple computers, wherein the kit controlling the multiple computers and an application thereof execute the following processes when a user presses the arbitrary channel selection button i with the remote controller, in process 1, the transmitting unit i of the remote controller transmits an activation command to the receiving unit i of the computer i, in process 2, when the control unit i of the computer i that receives the activation command through the receiving unit i of the computer i in process 1 receives input signals from m input devices, the control unit i transmits the input signals to the computer i, in process 3, each transmitting unit of the remote controller other than the transmitting unit i of the remote controller transmits a deactivation command to the corresponding receiving unit of each computer, and in process 4, the corresponding control unit that receives the deactivation command from the corresponding receiving unit of each computer in process 3 disregards the respective input signals received from m input devices.

In the above, the kit 2 controlling multiple computers, wherein in the kit controlling the multiple computers and the application thereof, when the user inputs the input signals by using an input device j among m input devices in process 2, the control unit i of the computer i processes the input signals of the input device j, j among them is equal to or smaller than m and j and i are not the same as each other, in process 21, a control unit j of the input device j transfers an input command of the user to the receiving unit i of the computer i, in process 22, the control unit i of the computer i transfers the input command received by the receiving unit i to the computer i, in process 23, the computer i determines from which input device the input command is an input command received and verifies that the corresponding input device is the input device j and thereafter, executes the input command, and in process 24, when the input command executed and processed by the computer i is a signal to request a feedback of the input device j, the control unit i of the computer i transmits the signal executed and processed by the computer i to a receiving unit A of the input device j through a transmitting unit A and the control unit j of the input device j executes and processes the corresponding signal and thereafter, retransmits the executed and processed signal to the computer i.

In the present invention, kit 3 controlling multiple computers, comprising:

n computers;
m input devices; and
one remote controller, wherein among them, each computer includes a receiving unit having the same frequency channels for each channel and a control unit controlling input command signal processing and the corresponding receiving unit, each input device includes a transmitting units having the same frequency, an input unit, and a control unit controlling input/output signal processing and modules in the input device, the remote controller includes the transmitting unit, n channel selection buttons to select the respective channels, and a control unit R controlling the input signal processing and the modules in the remote controller, the receiving units of n computers, the transmitting unit of the remote controller, and the transmitting units in m input devices have the same frequency, and a computer selected among n computers and m input devices are connected through the remote controller, and among them, n and m are the same as or different from each other and i is equal to or smaller than n.

In the above kit 3, kit 4 controlling multiple computers, wherein each computer among n computers additionally includes a transmitting unit B having the same frequency channel and each input device among m input devices additionally includes a receiving unit B having the same frequency, and among them, the transmitting units B of n computers and the receiving units B of m input devices have the same frequency channel and the control unit of the computer transfers a signal processed by the computer to the receiving unit B of the input device through the transmitting unit B.

The above kit 3 controlling multiple computers, wherein the kit controlling the multiple computers and an application thereof execute the following processes when a user presses the arbitrary channel selection button i with the remote controller, in process 1, a control unit R of the remote controller transmits an activation command of a computer i to n computers through a transmitting unit R of the remote controller, in process 2, when the control unit i of the computer i that receives an activation signal of the computer i through a receiving unit i of the computer i receives input signals from m input devices, the control i transmits the received input signals to the computer i, in process 3, a control unit of a residual computer other than the computer i also receives the activation command of the computer i through the corresponding receiving unit, and in process 4, the control units of other computers recognize the command received in process 3 as a deactivation command and disregards the input signals received from m input devices.

The above kit 4 controlling multiple computers, wherein the kit controlling the multiple computers and an application thereof execute the following processes when a user presses the arbitrary channel selection button i with the remote controller, in process 1, a control unit R of the remote controller transmits an activation command of a computer i to n computers through a transmitting unit R of the remote controller, in process 2, when the control unit i of the computer i that receives an activation signal of the computer i through a receiving unit i of the computer i receives input signals from m input devices, the control i transmits the received input signals to the computer i, in process 3, a control unit of a residual computer other than the computer i also receives the activation command of the computer i through the corresponding receiving unit, and in process 4, the control units of other computers recognize the command received in process 3 as a deactivation command and disregards the input signals received from m input devices.

In the above, the kit 4 controlling multiple computers, wherein in the kit controlling the multiple computers and the application thereof, when the user inputs the input signals by using an input device j among m input devices in process 2, the control unit i of the computer i processes the input signals of the input device j, j among them is equal to or smaller than m and j and i are not the same as each other, in process 21, a control unit j of the input device j transfers an input command of the user to the receiving unit i of the computer i, in process 22, the control unit i of the computer i transfers the input command received by the receiving unit i to the computer i, in process 23, the computer i determines from which input device the input command is an input command received and verifies that the corresponding input device is the input device j and thereafter, executes the input command, and in process 24, when the input command executed and processed by the computer i is a signal to request a feedback of the input device j, the control unit i of the computer i transmits the signal executed and processed by the computer i to a receiving unit B of the input device j through a transmitting unit B and the control unit j of the input device j executes and processes the corresponding signal and thereafter, retransmits the executed and processed signal to the computer i.

In the present invention, kit 5 controlling multiple computers, comprising:
  a wireless mouse;
  a wireless keyboard;
  two receivers; and
  two computers,
  wherein among them, each receiver is constituted by a receiving unit, a control unit, and an LED,
  a wireless mouse a includes a mouse transmission unit a transferring an input signal to a receiving unit a of a receiver a, a mouse transmission unit b transferring the input signal to a receiving unit b of a receiver b, a mouse control unit controlling input/output signal processing of the wireless mouse a and modules in the wireless mouse a, and a channel selection button a and a channel selection button b capable of switching channels between two computers and a wireless keyboard a includes a keyboard transmission unit a transferring the input signal to the receiving unit a of the receiver a, a keyboard transmission unit b transferring the input signal to the receiving unit b of the receiver b, and a control unit controlling the input/output signal processing of the wireless keyboard a and the modules in the wireless keyboard a,
  the receiver a includes the receiving unit a receiving signals transmitted by the mouse transmission unit a and the keyboard transmission unit a, an LED a displaying an operation state of the receiver a, and a control unit controlling the received input signal processing and the modules in the receiver a,
  the receiver b includes the receiving unit b receiving the signals transmitted by the mouse transmission unit b and the keyboard transmission unit b, an LED b displaying the operation state of the receiver b, and a control unit b controlling the received input signal processing and the modules in the receiver b,
  a computer a is connected to the receiver a and a computer b is connected to the receiver b,
  among them, the mouse transmission unit a, the keyboard transmission unit a, and the receiving unit a of the receiver a have the same frequency channel, and
  the mouse transmission unit b, the keyboard transmission unit b, and the receiving unit b of the receiver b use the same frequency channel.

In the above kit 5, kit 6 controlling multiple computers, wherein the receiver a is configured to further include a transmitting unit e1, the receiver b is configured to further include a transmitting unit e2, the wireless mouse a is configured to further include a mouse transmission unit e, and the wireless keyboard a is configured to further include a keyboard reception unit e,
  among them, the mouse reception unit e and the keyboard reception unit e receive the signals transmitted from the transmitting unit e1 of the receiver a and the transmitting unit e2 of the receiver b, and the transmitting unit e1 of the receiver a, the transmitting unit e2 of the receiver b, the mouse transmission unit e, and the keyboard reception unit e use the same frequency channel.

The above kit 5 or kit 6 controlling multiple computers, wherein the wireless mouse a is constituted by a mouse left button formed at a front left side, a mouse right button formed at a position symmetric to the mouse left button, a scroll button formed between the mouse left button and the mouse right button, and channel selection button a and channel selection button b formed in line at front and rear sides on the side of the mouse left button.

In the present invention, kit 7 controlling multiple computers, comprising:
  a wireless mouse;
  a wireless keyboard;
  two receivers; and
  two computers,
  wherein among them, each receiver is constituted by a receiving unit, a control unit, and an LED,
  a wireless mouse a includes a mouse transmission unit ab transferring input signals to a receiving unit a of a receiver a and a receiving unit b of a receiver b, a mouse control unit controlling input/output signal processing of the wireless mouse a and modules in the wireless mouse a, and a channel selection button a and a channel selection button b capable of switching channels between two computers,
  a wireless keyboard a includes a keyboard transmission unit ab transferring the input signals to the receiving unit a of the receiver a and the receiving unit b of the receiver b and a control unit controlling the input/output signal processing of the wireless keyboard a and the modules in the wireless keyboard a, and
  the receiver a includes the receiving unit a receiving signals transmitted by the mouse transmission unit ab and the keyboard transmission unit ab, an LED a displaying an operation state of the receiver a, and a control unit controlling the received input/output signal processing and the modules in the receiver a,
  the receiver b includes the receiving unit b receiving the signals transmitted by the mouse transmission unit ab and the keyboard transmission unit ab, an LED b displaying the operation state of the receiver b, and a control unit b controlling the received input signal processing and the modules in the receiver b, and
  a computer a is connected to the receiver a and a computer b is connected to the receiver b, and
  among them, the mouse transmission unit ab, the keyboard transmission unit ab, the receiving unit a of the receiver a, and the receiving unit b of the receiver b use the same channel.

In the above kit 7, kit 8 controlling multiple computers, wherein the receiver a is configured to further include a transmitting unit e1, the receiver b is configured to further include a transmitting unit e2, the wireless mouse a is configured to further include a mouse transmission unit e, and the wireless keyboard a is configured to further include a keyboard reception unit e,
  among them, the mouse reception unit e and the keyboard reception unit e receive and distinguish the signals transmitted from the transmitting unit e1 of the receiver a and the transmitting unit e2 of the receiver b, and the transmitting unit e1 of the receiver a and the transmitting unit e2 of the receiver b transmit the signals to the mouse reception unit e and the keyboard reception unit e by distinction, and the transmitting unit e1 of the receiver a, the transmitting unit e2 of the receiver b, the mouse transmission unit e, and the keyboard reception unit e use the same frequency channel.

The above kit 7 or kit 8 controlling multiple computers, wherein the wireless mouse a is constituted by a mouse left button formed at a front left side, a mouse right button formed at a position symmetric to the mouse left button, a scroll button formed between the mouse left button and the mouse right button, and channel selection button a and channel selection button b formed in line at front and rear sides on the side of the mouse left button.

SUMMARY

According to the present invention, since multiple computers can be selectively used with one wireless mouse and one wireless keyboard, cost is saved and efficiency of a work space is enhanced and since data can be input in a computer designated by the wireless mouse only with a channel selection button positioned in the wireless mouse, convenience of a user is enhanced.

According to the present invention, in the computer which the user intends to use, the wireless keyboard allows a function of the channel selection button of the wireless mouse to move focusing to be seemed as if a separate communication means enabling transmission and reception between the wireless mouse and the wireless keyboard exists, but such a communication means does not actually exist.

Therefore, when the wireless mouse and the wireless keyboard are used, the wireless mouse and the wireless keyboard can be configured to enter "WakeUp Mode" and when the wireless mouse and the wireless keyboard are not used, the wireless mouse and the wireless keyboard can be configured to enter "Sleep Mode", the wireless mouse and the wireless keyboard can be used for a long time.

BRIEF DESCRIPTION OF THE DRAWINGS

FIG. 8 is a unidirectional block diagram of a method that divides the channel at the same frequency among the methods that enable the equipment desired by the user among the multiple computers to be manipulated with the multiple input devices according to the present invention.

DETAILED DESCRIPTION OF THE PREFERRED EMBODIMENT

FIGS. 1 to 9 present a detailed execution method of the present invention and in FIGS. 1 to 9, a description of the invention takes a major step forward, but a detailed description limited to the invention is not made.

First, in describing contents of the present invention, features of the present invention in a mouse and a keyboard having basic functions are described.

Figure 1:
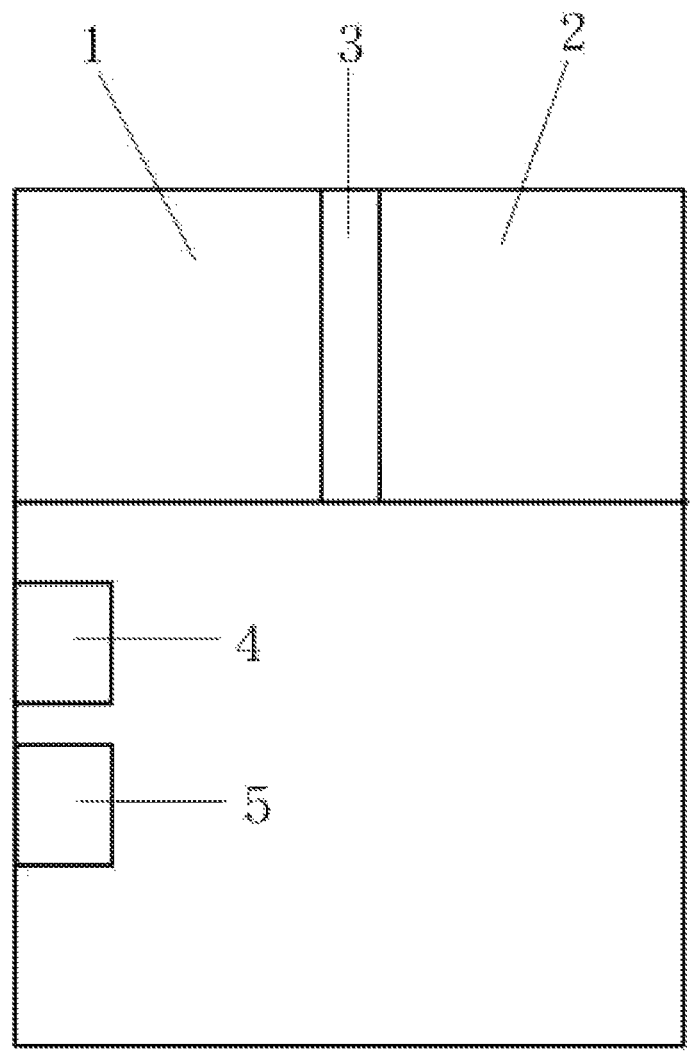
FIG. 1 is a structural drawing of a wireless mouse according to the present invention.

In FIG. 1, a wireless mouse of the present invention is constituted by a mouse left button formed at a front left side, a mouse right button formed at a position symmetric to the mouse left button, a scroll button formed between the mouse left button and the mouse right button, and channel selection button 1 and channel selection button 2 formed in line at front and rear sides on the side of the mouse left button.

A wireless keyboard is a keyboard in which "QWERTY" keyboards are externally arranged. The channel selection button may be used while being mounted even on the wireless keyboard and applied even as a toggle button and this is included in the scope of the spirit of the present invention.

In order to simplify the description of the contents, input operations of the mouse left button, the mouse right button, the scroll button, and the like of the wireless mouse except for an input operation of the channel selection button are simply referred to as a mouse input and input operations of the keyboards of the wireless keyboard are referred to as a keyboard input.

According to the present invention, when transmitting units of the wireless mouse and the wireless keyboard intend to communicate with receiving units positioned in respective receivers, communication channels need to be separated from each other in each pair of transmitting and receiving units and a method for separating the communication channels includes a method for differentiating a frequency and a method for dividing a channel by time division or code division or other methods in spite of the same frequency.

Figure 2:
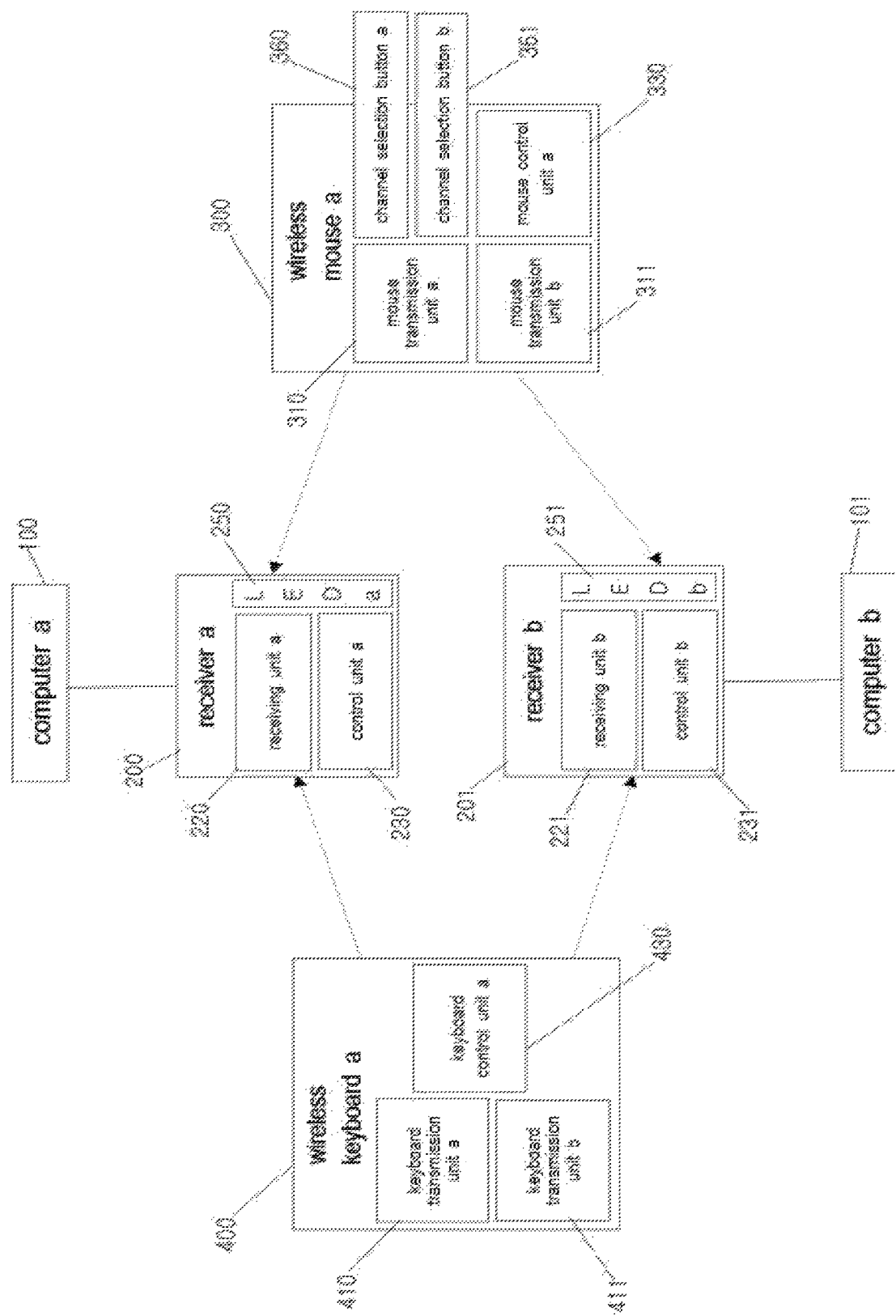
FIG. 2 is a block diagram of a system constituted by a unidirectional wireless mouse, a unidirectional wireless keyboard, and two computers of the scheme that differentiates the frequency according to the present invention.

FIG. 2 is a block diagram of a system constituted by a unidirectional wireless mouse, a unidirectional wireless keyboard, and two computers of the scheme that differentiates the frequency according to the present invention.

In FIG. 2, a wireless mouse a 300 of the present invention is constituted by a mouse transmission unit a 310 that transmits an input signal to a receiving unit a 220 of a receiver a 200, a mouse transmission unit b 311 that transmits the input signal to a receiving unit b 221 of a receiver b 201, a mouse control unit a 330 that controls input/output signal processing of the wireless mouse a 300 and the modules in the wireless mouse a 300, and a channel selection button a 360 and a channel selection button b 361 that allows a user to select a desired computer.

A wireless keyboard of the present invention a 400 is constituted by a keyboard transmission unit a 410 that transmits the input signal to the receiving unit a 220 of the receiver a 200, a keyboard transmission unit b 410 that transmits the input signal to the receiving unit b 221 of the receiver b 200, and a keyboard control unit a 430 that controls the input/output signal processing of the wireless keyboard a 400 and the modules in the wireless keyboard a 400.

The receiver a 200 is connected to a computer a 100 and the receiver b 201 is connected to a computer b 101.

The receiver a 200 is constituted by the receiving unit a 220 that receives the signals transmitted from the mouse transmission unit a 310 and the keyboard transmission unit a 410, an LED a 250 that displays an operation state of the receiver a 200, and a control unit a 230 that controls the input signal processing and the modules in the receiver a 200.

The receiver b 201 is constituted by the receiving unit b 221 that receives the signals transmitted from the mouse transmission unit b 311 and the keyboard transmission unit b 411, an LED b 251 that displays the operation state of the receiver b 201, and a control unit b 231 that controls the input signal processing and the modules in the receiver b 201.

The mouse transmission unit a 310, the keyboard transmission unit a 410, and the receiving unit a 220 of the receiver a 200 have the same frequency channel, the mouse transmission unit b 311, the keyboard transmission unit b 411, and the receiving unit b 221 of the receiver b 201 have the same frequency channel.

When the channel selection button a 360 is pressed, the mouse control unit a 330 performs the following process.

In process 1, the mouse transmission unit a 310 transmits an "activation" signal to the receiving unit a 220 of the receiver a 200 and in the process 1, the control unit a 230 of the receiver a 200 that receives the "activation" signal from the receiving unit a 220 of the receiver a 200 turns on the LED a 250 and when the mouse input or the keyboard input is received, the control unit a 230 transmits the received mouse input or keyboard input to the computer a 100.

In process 2, the mouse transmission unit b 311 transmits a "deactivation" signal to the receiving unit b 221 of the receiver b 201 and in the process 2, the control unit b 231 of the receiver b 201 that receives the "deactivation" signal from the receiving unit b 221 of the receiver b 201 turns off the LED b 251 and when the mouse input or the keyboard input is received, the control unit b 231 disregards the received mouse input or keyboard input without transmitting the received mouse input or keyboard input to the computer b 101.

In process 3, after processes 1 and 2 are executed, the mouse transmission unit b 313 becomes in a "non-operation state". Here in, even in skipping the process 3, it works normally. But, it can reduce a battery consumption of the wireless mouse little more.

When states after processes 1, 2, and 3 are performed are organized, the mouse transmission unit a 310 is in an "operation standby state", the receiver a 200 is in an "activation" state, the LED a 250 is turned on, the mouse transmission unit b 311 is in the "non-operation state", the receiver b 201 is in the "deactivation" state, and the LED b 251 is turned off In the states, when the mouse input or the keyboard input is received, only the computer a 100 operates.

Unlike this, when the channel selection button b 361 is pressed, the mouse control unit a 330 performs the following process.

In process 4, the mouse transmission unit b 311 transmits an "activation" signal to the receiving unit b 221 of the receiver b 201 and in the process 4, the control unit b 231 of the receiver b 201 that receives the "activation" signal from the receiving unit b 221 of the receiver b 201 turns on the LED b 251 and when the mouse input or the keyboard input is received, the control unit b 231 transmits the received mouse input or keyboard input to the computer b 101.

In process 5, the mouse transmission unit a 310 transmits a "deactivation" signal to the receiving unit a 220 of the receiver a 200 and in the process 5, the control unit a 230 of the receiver a 200 that receives the "deactivation" signal from the receiving unit a 220 of the receiver a 200 turns off the LED a 250 and when the mouse input or the keyboard input is received, the control unit a 230 disregards the received mouse input or keyboard input without transmitting the received mouse input or keyboard input to the computer a 100.

In process 6, after processes 1 and 2 are executed, the mouse transmission unit a 310 becomes in a "non-operation state".

When states after processes 4, 5, and 6 are performed are organized, the mouse transmission unit b 311 is in an "operation standby state", the receiver b 201 is in an "activation" state, the LED b 251 is turned on, the mouse transmission unit a 310 is in the "non-operation state", the receiver a 200 is in the "deactivation" state, and the LED a 250 is turned off.

In the states, when the mouse input or the keyboard input is received, only the computer b 101 operates.

The mouse input of the wireless mouse a 300 is transmitted only through the mouse transmission unit which is in the "operation standby state" by the mouse control unit a 330 to be transferred to the receiving unit of the receiver having the same channel and the mouse transmission unit which is in the "non-operation state" does not operate.

Unlike the wireless mouse a 300, the keyboard input of the wireless keyboard a 400 is transferred to both the receiver a 200 and the receiver b 201 through the keyboard transmission unit a 410 and the keyboard transmission unit b 411 by the keyboard control unit a 430, but only the computer of the receiver which is activated operates and the computer of the receiver which is deactivated does not operate.

The "activation", the "deactivation", the "non-operation state", and the "operation standby state" written in the contents mean states after the corresponding control unit executes the corresponding process according to a specific command signal and are described by matching an original meaning of a term for easy description.

The "activation" of the receiver means a state in which when the mouse input or the keyboard input is received by the control unit of the receiver through the receiving unit of the selected receiver, the control unit of the receiver transmits the received mouse input or keyboard input to the connected computer to allow the computer to execute the input of the mouse or keyboard and the "deactivation" of the receiver means a state in which when the mouse input or the keyboard input is received by the control unit of the receiver through the receiving unit of the selected receiver, the control unit of the receiver does not transmit the mouse input or the keyboard input to the connected computer and disregards the mouse input or the keyboard input. That is, the deactivated receiver does not operate by the input of the mouse or keyboard except for manipulation of the channel selection button of the wireless mouse.

The "non-operation state" of the mouse transmission unit means a state in which it is impossible to transmit the mouse input through the corresponding mouse transmission unit except for the signal generated by the channel selection button.

The "operation standby state" of the mouse transmission unit means a state in which it is possible to transmit the signal generated by the channel selection button and the mouse input through the corresponding mouse transmission unit.

Figure 3:
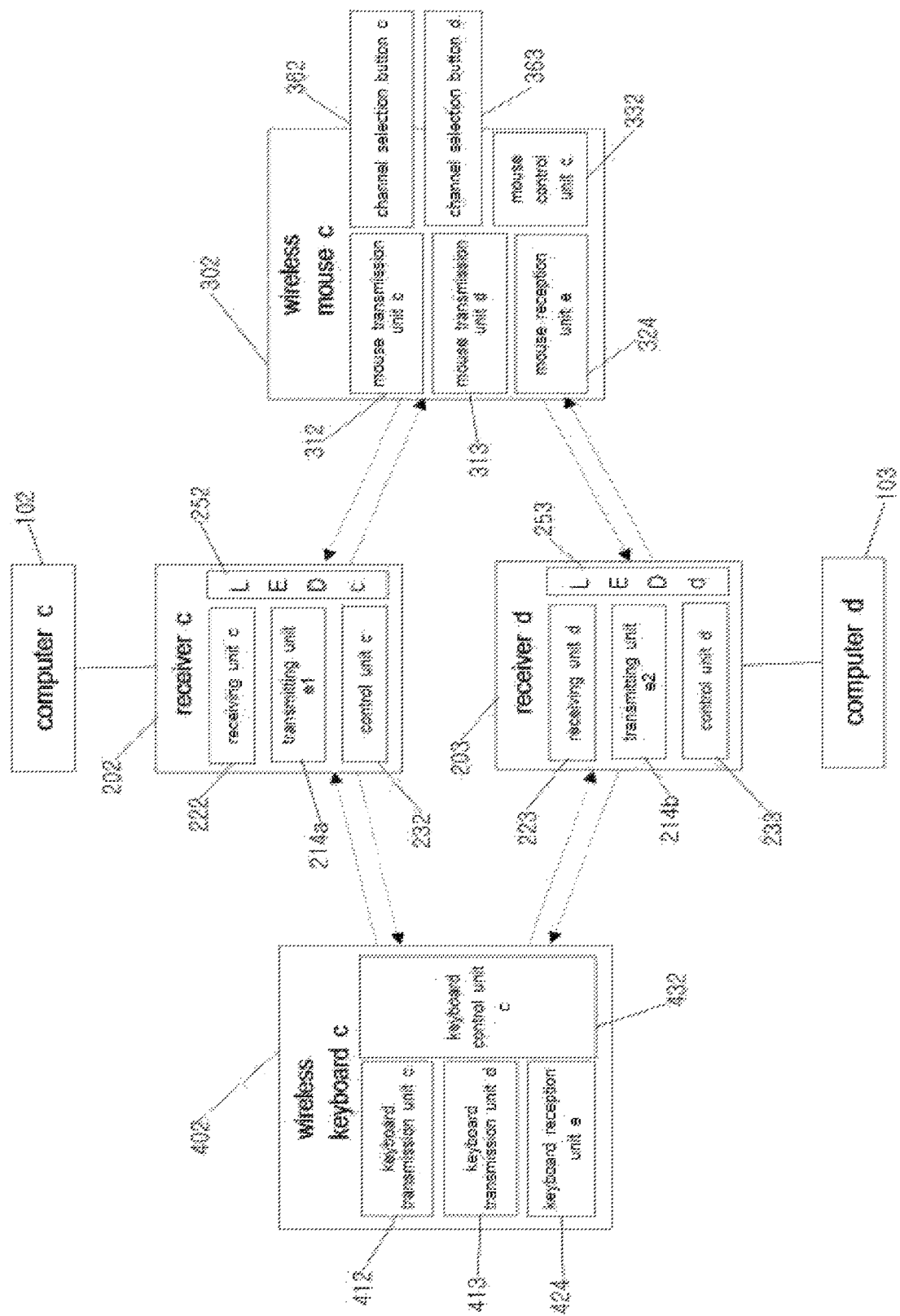
FIG. 3 is a block diagram of a system constituted by a bidirectional wireless mouse, a bidirectional wireless keyboard, and two computers of the scheme that differentiates the frequency according to the present invention.

FIG. 3 is a block diagram of a system constituted by a bidirectional wireless mouse, a bidirectional wireless keyboard, and two computers of the scheme that differentiates the frequency according to the present invention.

In FIG. 3, a wireless mouse c 302 of the present invention is constituted by a mouse transmission unit c 312 that transmits an input signal to a receiving unit c 222 of a receiver c 202, a mouse transmission unit d 313 that transmits the input signal to a receiving unit d 223 of a receiver d 203, a mouse reception unit e 324 receiving signals transmitted from the transmitting unit e1 214a of the receiver c 202 and a transmitting unit e2 214b of a receiver d 203, a mouse control unit c 332 that controls input/output signal processing of the wireless mouse c 302 and the modules in the wireless mouse c 302, and a channel selection button c 362 and a channel selection button d 363 that allows a user to select a desired computer.

A wireless keyboard c 402 is constituted by a keyboard transmission unit c 412 that transmits the input signal to the receiving unit c 222 of the receiver c 202, a keyboard transmission unit d 413 that transmits the input signal to the receiving unit d 223 of the receiver d 203, a keyboard reception unit e 424 receiving the signals transmitted from the transmitting unit e1 214a of the receiver c 202 and the transmitting unit e2 214b of the receiver d 203, and a keyboard control unit c 432 that controls the input/output signal processing of the wireless keyboard c 402 and the modules in the wireless keyboard c 402.

The receiver c 202 is connected to a computer c 102 and the receiver d 203 is connected to a computer d 103.

The receiver c 202 is constituted by the receiving unit c 222 that receives the signals transmitted from the mouse transmission unit c 312 and the keyboard transmission unit c 412, the transmitting unit e1 214a that transmits the signals to the mouse reception unit e 324 and the keyboard reception unit e 424, an LED c 252 that displays an operation state of the receiver c 202, and a control unit c 232 that controls the input signal processing and the modules in the receiver c 202.

The receiver d 203 is constituted by the receiving unit d 223 that receives the signals transmitted from the mouse transmission unit d 313 and the keyboard transmission unit d 413, the transmitting unit e2 214b that transmits the signals to the mouse reception unit e 324 and the keyboard reception unit e 424, an LED d 253 that displays the operation state of the receiver d 203, and a control unit d 233 that controls the input signal processing and the modules in the receiver d 203.

The mouse transmission unit c 312, the keyboard transmission unit c 412, and the receiving unit c 222 of the receiver c 202 have the same frequency channel, the mouse transmission unit d 313, the keyboard transmission unit d 413, and the receiving unit d 223 of the receiver d 203 have the same frequency channel, and the transmitting unit e1 214a of the receiver c 202, the transmitting unit e2 214b of the receiver d 203, the mouse reception unit e 324, and the keyboard reception unit e 424 have the same frequency channel.

When the channel selection button c 362 is pressed, the mouse control unit c 332 performs the following process.

In process 7, the mouse transmission unit c 312 transmits an "activation" signal to the receiving unit c 222 of the receiver c 202 and in the process 7, the control unit c 232 of the receiver c 202 that receives the "activation" signal from the receiving unit c 222 of the receiver c 202 turns on the LED c 252 and when the mouse input or the keyboard input is received, the control unit c 232 transmits the received mouse input or keyboard input to the computer c 102.

In process 8, the mouse transmission unit d 313 transmits a "deactivation" signal to the receiving unit d 223 of the receiver d 203 and in the process 8, the control unit d 233 of the receiver d 203 that receives the "deactivation" signal from the receiving unit d 223 of the receiver d 203 turns off the LED d 253 and when the mouse input or the keyboard input is received, the control unit d 233 disregards the received mouse input or keyboard input without transmitting the received mouse input or keyboard input to the computer d 103.

In process 9, after processes 7 and 8 are executed, the mouse transmission unit d 313 becomes in a "non-operation state".

When states after processes 7, 8, and 9 are performed are organized, the mouse transmission unit c 312 is in an "operation standby state", the receiver c 202 is in an "activation" state, the LED c 252 is turned on, the mouse transmission unit d 313 is in the "non-operation state", the receiver d 203 is in the "deactivation" state, and the LED d 253 is turned off In the states, when the mouse input or the keyboard is received, only the computer c 102 operates.

Unlike this, when the channel selection button d 363 is pressed, the mouse control unit c 332 performs the following process.

In process 10, the mouse transmission unit d 313 transmits an "activation" signal to the receiving unit d 223 of the receiver d 203 and in the process 10, the control unit d 233 of the receiver d 203 that receives the "activation" signal from the receiving unit d 223 of the receiver d 203 turns on the LED d 253 and when the mouse input or the keyboard input is received, the control unit d 233 transmits the received mouse input or keyboard input to the computer d 103.

In process 11, the mouse transmission unit c 312 transmits a "deactivation" signal to the receiving unit c 222 of the receiver c 202 and in the process 11, the control unit c 232 of the receiver c 202 that receives the "deactivation" signal from the receiving unit c 222 of the receiver c 202 turns off the LED c 252 and when the mouse input or the keyboard input is received, the control unit c 232 disregards the received mouse input or keyboard input without transmitting the received mouse input or keyboard input to the computer c 102.

In process 12, after processes 10 and 11 are executed, the mouse transmission unit c 312 becomes in a "non-operation state".

When states after processes 10, 11, and 12 are performed are organized, the mouse transmission unit d 313 is in an "operation standby state", the receiver d 203 is in an "activation" state, the LED d 253 is turned on, the mouse transmission unit c 312 is in the "non-operation state", the receiver c 202 is in the "deactivation" state, and the LED c 252 is turned off.

In the states, when the mouse input or the keyboard is received, only the computer d 103 operates.

The mouse input of the wireless mouse c 302 is transmitted only through the mouse transmission unit which is in the "operation standby state" by the mouse control unit c 332 to be transferred to the receiving unit of the receiver having the same channel and the mouse transmission unit which is in the "non-operation state" does not operate.

Unlike the wireless mouse c 302, the keyboard input of the wireless keyboard c 402 is transferred to both the receiver c 202 and the receiver d 203 through the keyboard transmission unit c 412 and the keyboard transmission unit d 413 by the keyboard control unit c 432, but only the computer of the receiver which is activated operates and the computer of the receiver which is deactivated does not operate.

In the contents, it is described that the wireless keyboard simultaneously transmits the input signal to two receivers by using the transmitting units, but it is possible to transmit the input signal to the activated receiver by using only one transmitting unit. The reason is that since the transmitting unit is installed even in the receiver, the status of the deactivated receiver is notified to the wireless keyboard to allow the corresponding transmitting unit of the wireless keyboard to be in the "non-operation state". In addition, as compared with a unidirectional transmission/reception type, as an advantage of a bidirectional transmission/reception type, the computer may read state values of the wireless mouse and the wireless keyboard to measure the life-span of the batteries of the wireless mouse and the wireless keyboard and diagnose and check defects of the wireless mouse and the wireless keyboard and as necessary, functions to allow the user to perform transmission/reception bidirectionally are inserted to manufacture various products.

Figure 4:
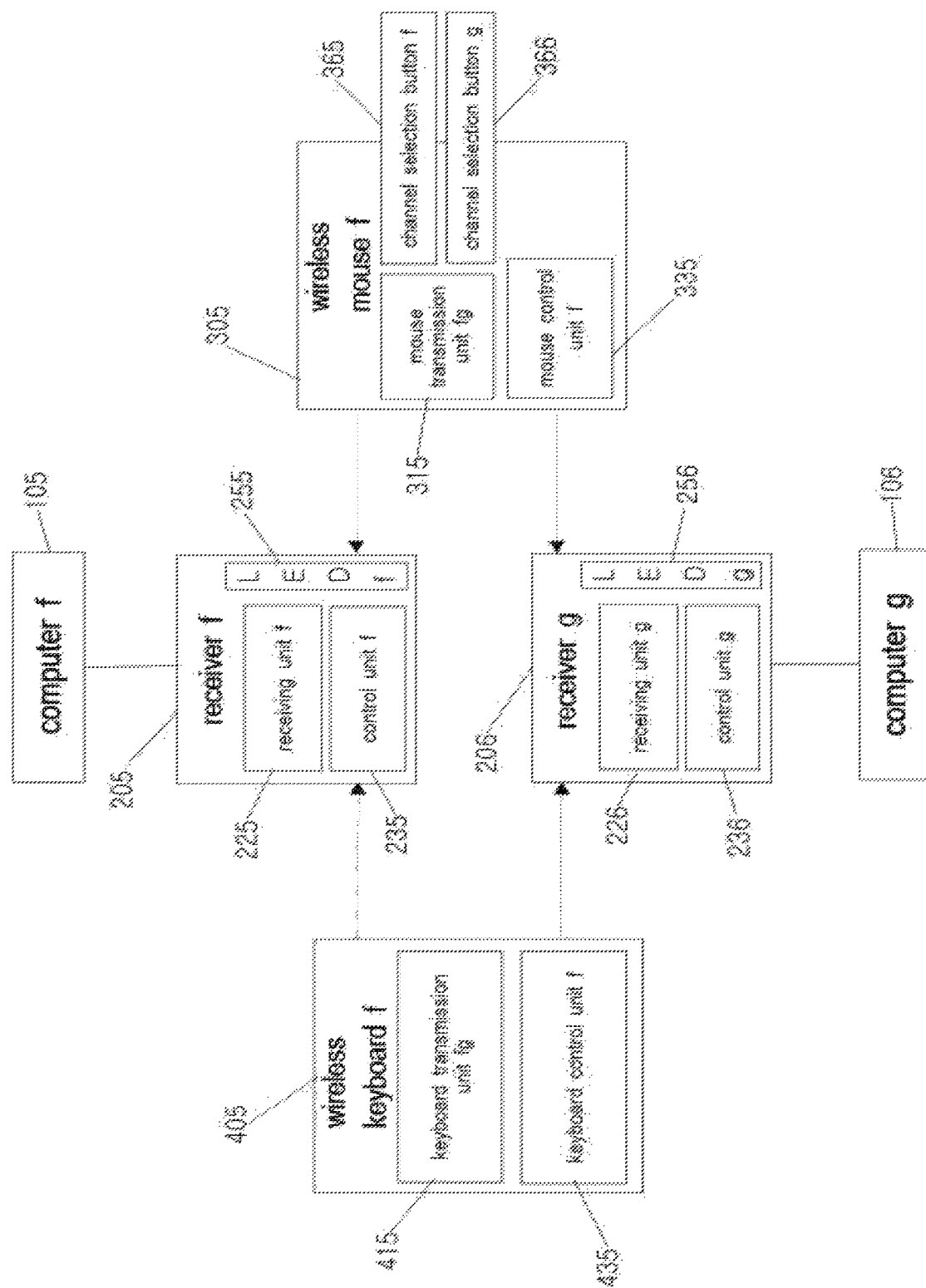
FIG. 4 is a block diagram of a system constituted by a unidirectional wireless mouse, a unidirectional wireless keyboard, and two computers in a scheme that divides a channel at the same frequency according to the present invention.

FIG. 4 is a block diagram of a system constituted by a unidirectional wireless mouse, a unidirectional wireless keyboard, and two computers in a scheme that divides a channel at the same frequency according to the present invention.

In FIG. 4, a wireless mouse f 305 of the present invention is constituted by a mouse transmission unit fg 315 that transmits the input signals to a receiving unit f 205 of a receiver f 205 and a receiving unit g 226 of a receiver g 206, and a mouse control unit f 335 that controls the input/output signal processing of the wireless mouse f 305 and the modules in the wireless mouse f 305, and a channel selection button f 365 and a channel selection button g 366 that allows the user to select the desired computer.

A wireless keyboard f 405 of the present invention is constituted by a keyboard transmission unit fg 415 that transmits the input signals to the receiving unit f 225 of the receiver f 205 and the receiving unit g 226 of the receiver g 206, and a keyboard control unit f 435 that controls the input/output signal processing of the wireless keyboard f 405 and the modules in the wireless keyboard f 405.

The receiver f 205 is connected to a computer f 105 and the receiver g 206 is connected to a computer g 106.

The receiver f 205 is constituted by the receiving unit f 225 that receives the signals transmitted from the mouse transmission unit fg 315 and the keyboard transmission unit fg 415, an LED f 255 that displays the operation state of the receiver f 205, and a control unit f 235 that controls the input signal processing and the modules in the receiver f 205.

The receiver g 206 is constituted by the receiving unit g 226 that receives the signals transmitted from the mouse transmission unit fg 315 and the keyboard transmission unit fg 415, an LED g 256 that displays the operation state of the receiver g 206, and a control unit g 236 that controls the input signal processing and the modules in the receiver g 206.

The mouse transmission unit fg 315, the keyboard transmission unit fg 415, the receiving unit f 225 of the receiver f 205, and the receiving unit g 226 of the receiver g 206 use the same frequency.

When the channel selection button f 365 is pressed, the mouse control unit f 335 transmits an "activation of receiver f" signal to the receiving unit f 225 of the receiver f 205 and the receiving unit g 226 of the receiver g 206 through the mouse transmission unit fg 315. The control unit f 235 of the receiver f 205 that receives the "activation of receiver f" signal turns on the LED f 255 and when the control unit f 235 receives the mouse input or the keyboard input, the control unit f 235 of the receiver f 205 transmits the mouse input or the keyboard input to the computer f 105. Simultaneously therewith, the control unit g 236 of the receiver g 206 that receives the "activation of receiver f" signal turns off the LED g 256 and when the control unit g 236 of the receiver g 206 receives the mouse input or the keyboard input, the control unit g 236 of the receiver g 206 does not transmit the mouse input or the keyboard input to the computer g 106 but disregards the mouse input or the keyboard input.

When the states progressed after the channel selection button f 365 is pressed, the receiver f 205 is in the "activation" state, the LED f 255 is turned on, the receiver g 206 is in the "deactivation" state, and the LED g 256 is turned off.

In the states, when the mouse input or the keyboard is received, only the computer f 105 operates.

When the channel selection button g 366 is pressed, the mouse control unit f 335 transmits an "activation of receiver g" signal to the receiving unit f 225 of the receiver f 205 and the receiving unit g 226 of the receiver g 206 through the mouse transmission unit fg 315. The control unit g 236 of the receiver g 206 that receives the "activation of receiver g" signal turns on the LED g 256 and when the control unit g 236 of the receiver g 206 receives the mouse input or the keyboard input, the control unit g 236 of the receiver g 206 transmits the mouse input or the keyboard input to the computer g 106.

Simultaneously therewith, the control unit f 235 of the receiver f 205 that receives the "activation of receiver g" signal turns off the LED f 255 and when the control unit f 235 of the receiver f 205 receives the mouse input or the keyboard input, the control unit f 235 of the receiver f 205 does not transmit the mouse input or the keyboard input to the computer f 105 but disregards the mouse input or the keyboard input.

When the states progressed after the channel selection button g 366 is pressed, the receiver g 206 is in the "activation" state, the LED g 256 is turned on, the receiver f 205 is in the "deactivation" state, and the LED f 255 is turned off.

In the states, when the mouse input or the keyboard is received, only the computer g 106 operates.

The mouse input of the wireless mouse f 305 is transferred to the receiving unit f 225 of the receiver f 205 and the receiving unit h 226 of the receiver h 206 through the mouse transmission unit fg 315 by the mouse control unit f 335, but only the computer of the activated receiver operates and the computer of the deactivated receiver does not operate.

Similarly to the wireless mouse f 305, the keyboard input of the wireless keyboard f 405 is transferred to the receiving unit f 225 of the receiver f 205 and the receiving unit g 226 of the receiver g 206 through the keyboard transmission unit fg 415, but only the computer of the activated receiver operates and the computer of the deactivated receiver does not operate. When the signal inputs of the wireless mouse f and the wireless keyboard f are simultaneously executed, a frequency collision is anticipated due to the same frequency, but the signal input is configured by different channels.

Figure 5:
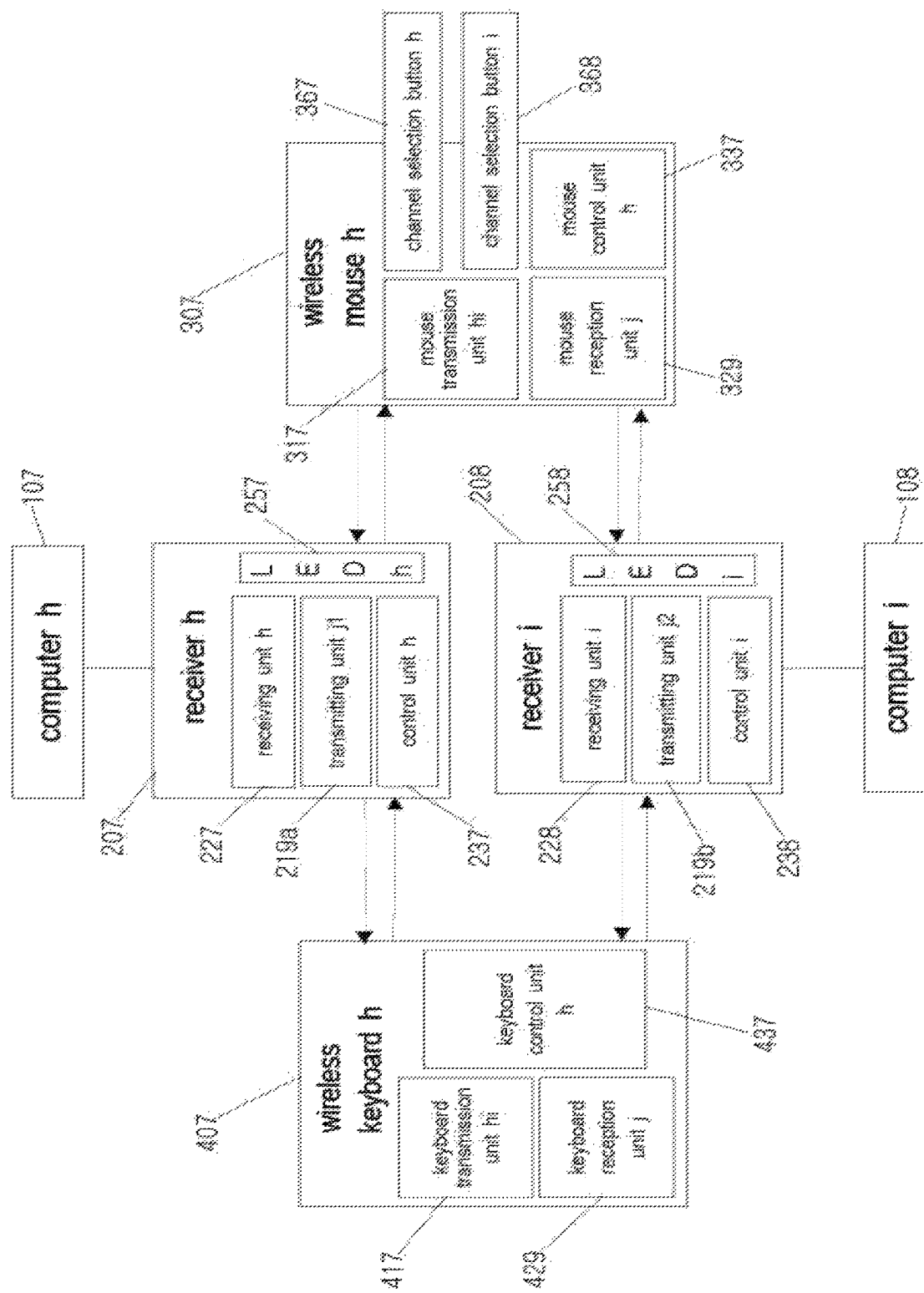
FIG. 5 is a block diagram of a system constituted by a bidirectional wireless mouse, a bidirectional wireless keyboard, and two computers in the scheme that divides the channel at the same frequency according to the present invention.

FIG. 5 is a block diagram of a system constituted by a bidirectional wireless mouse, a bidirectional wireless keyboard, and two computers in the scheme that divides the channel at the same frequency according to the present invention.

In FIG. 5, a wireless mouse h 307 of the present invention is constituted by a mouse transmission unit hi 317 that transmits the input signals to a receiving unit h 207 of a receiver h 207 and a receiving unit i 228 of a receiver i 208, a mouse reception unit e 329 receiving the signals transmitted from a transmission unit j1 219a of the receiver h 207 and a transmitting unit j2 219b of a receiver i 208, and a mouse control unit h 337 that controls the input/output signal processing of the wireless mouse h 307 and the modules in the wireless mouse h 307, and a channel selection button h 367 and a channel selection button i 368 that allows the user to select the desired computer.

A wireless keyboard h 407 of the present invention is constituted by a keyboard transmission unit hi 417 that transmits the input signals to the receiving unit h 227 of the receiver h 207 and the receiving unit i 228 of the receiver i 208, a keyboard reception unit j 429 that receives the signals transmitted from the transmission unit j1 219a of the receiver h 207 and the transmitting unit j2 219b of the receiver i 208, and a keyboard control unit h 437 that controls the input/output signal processing of the wireless keyboard h 407 and the modules in the wireless keyboard h 407.

The receiver h 207 is connected to a computer h 107 and the receiver i 208 is connected to a computer i 108.

The receiver h 207 is constituted by the receiving unit h 227 that receives the signals transmitted from the mouse transmission unit hi 317 and the keyboard transmission unit hi 417, the transmitting unit j1 219a that transmits the signals to the mouse reception unit j 329 and the keyboard reception unit j 429, an LED h 257 that displays the operation state of the receiver h 207, and a control unit h 237 that controls the input signal processing and the modules in the receiver h 207.

The receiver i 208 is constituted by the receiving unit i 228 that receives the signals transmitted from the mouse transmission unit hi 317 and the keyboard transmission unit hi 417, the transmitting unit j2 219b that transmits the signals to the mouse reception unit j 329 and the keyboard reception unit j 429, an LED i 258 that displays the operation state of the receiver i 208, and a control unit i 238 that controls the input signal processing and the modules in the receiver i 208.

The mouse transmission unit hi 317, the keyboard transmission unit hi 417, the receiving unit h 227 of the receiver h 207, and the receiving unit i 228 of the receiver i 208 use the same frequency and the transmitting unit ji 219a of the receiver h 207, the transmitting unit j2 219b of the receiver i 208, the mouse reception unit j 329, and the keyboard reception unit 429 use the same frequency.

When the channel selection button h 367 is pressed, the mouse control unit h 337 transmits an "activation of receiver h" signal to the receiving unit h 227 of the receiver h 207 and the receiving unit i 228 of the receiver i 208 through the mouse transmission unit hi 317. The control unit h 237 of the receiver h 207 that receives the "activation of receiver h" signal turns on the LED h 257 and when the control unit h 237 receives the mouse input or the keyboard input, the control unit h 237 of the receiver h 207 transmits the mouse input or the keyboard input to the computer h 107. Simultaneously therewith, the control unit i 238 of the receiver i 208 that receives the "activation of receiver h" signal turns off the LED i 258 and when the control unit i 238 of the receiver i 208 receives the mouse input or the keyboard input, the control unit i 238 of the receiver i 208 does not transmit the mouse input or the keyboard input to the computer i 108 but disregards the mouse input or the keyboard input.

When the states progressed after the channel selection button h 367 is pressed, the receiver h 207 is in the "activation" state, the LED h 257 is turned on, the receiver i 208 is in the "deactivation" state, and the LED i 258 is turned off.

In the states, when the mouse input and the keyboard are received, only the computer i 108 operates.

When the channel selection button i 368 is pressed, the mouse control unit h 337 transmits an "activation of receiver h" signal to the receiving unit h 227 of the receiver h 207 and the receiving unit i 228 of the receiver i 208 through the mouse transmission unit hi 317. The control unit i 238 of the receiver i 208 that receives the "activation of receiver i" signal turns on the LED i 258 and when the control unit i 238 receives the mouse input or the keyboard input, the control unit i 238 of the receiver i 208 transmits the mouse input or the keyboard input to the computer i 108. Simultaneously therewith, the control unit h 237 of the receiver h 207 that receives the "activation of receiver i" signal turns off the LED h 257 and when the control unit h 237 of the receiver h 207 receives the mouse input or the keyboard input, the control unit h 237 of the receiver h 207 does not transmit the mouse input or the keyboard input to the computer h 107 but disregards the mouse input or the keyboard input.

When the states progressed after the channel selection button i 368 is pressed, the receiver i 208 is in the "activation" state, the LED i 258 is turned on, the receiver h 207 is in the "deactivation" state, and the LED h 257 is turned off.

In the states, when the mouse input and the keyboard are received, only the computer i 108 operates.

The mouse input of the wireless mouse h 307 is transferred to the receiving unit h 227 of the receiver h 207 and the receiving unit i 228 of the receiver i 208 through the mouse transmission unit hi 317 by the mouse control unit h 337, but only the computer of the activated receiver operates and the computer of the deactivated receiver does not operate.

Similarly to the wireless mouse h 307, the keyboard input of the wireless keyboard h 407 is transferred to the receiving unit h 227 of the receiver h 207 and the receiving unit i 228 of the receiver i 208 through the keyboard transmission unit hi 417, but only the computer of the activated receiver operates and the computer of the deactivated receiver does not operate.

As contents to be described next, a method that may extend applicability is described by specifically describing channel selection button functions of the frequency channel scheme and the channel division scheme.

Figure 6:
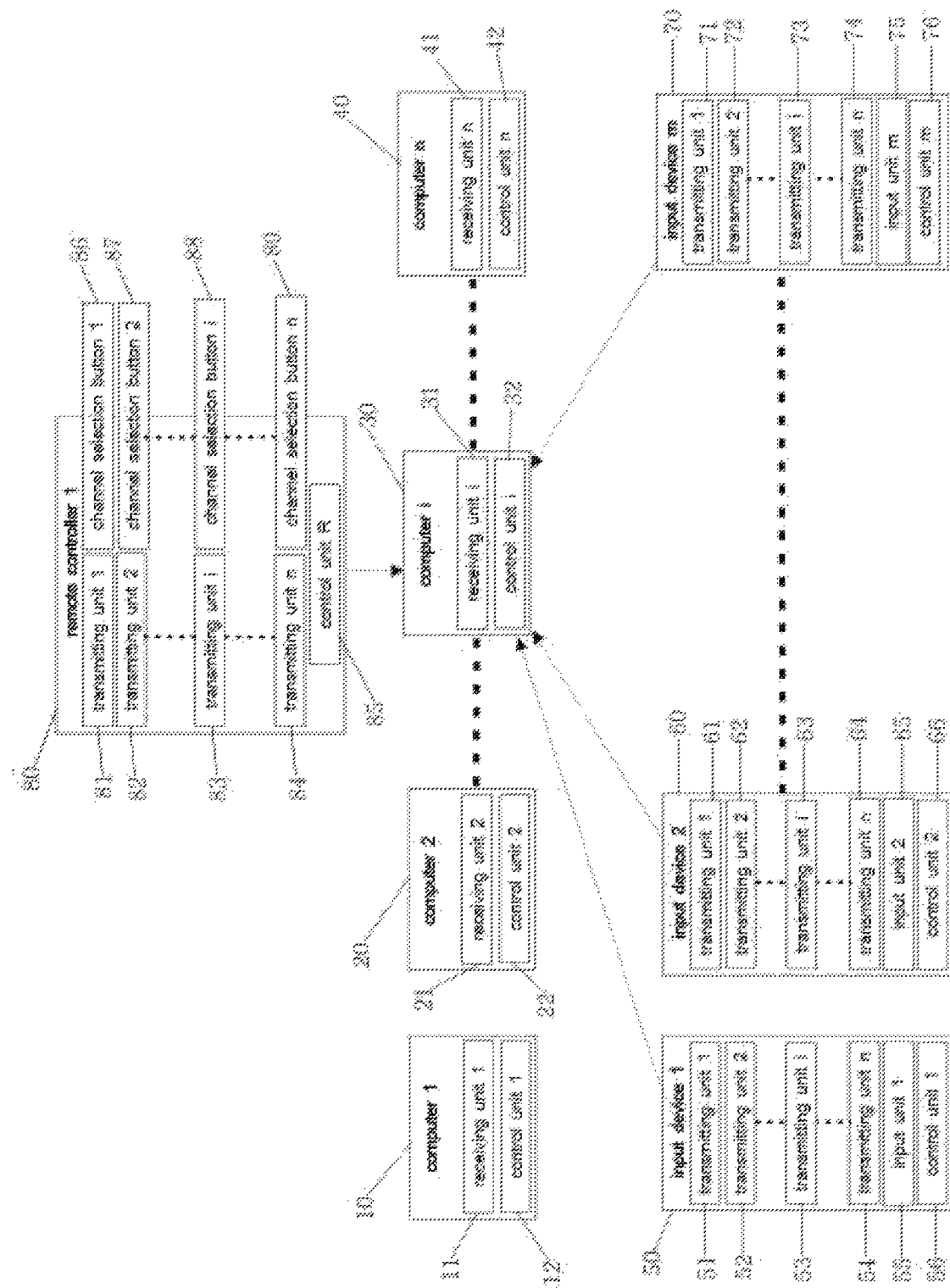
FIG. 6 is a unidirectional block diagram of a method that differentiates the frequency among methods that enable an equipment desired by the user among multiple computers to be manipulated with multiple input devices according to the present invention.
Figure 7:
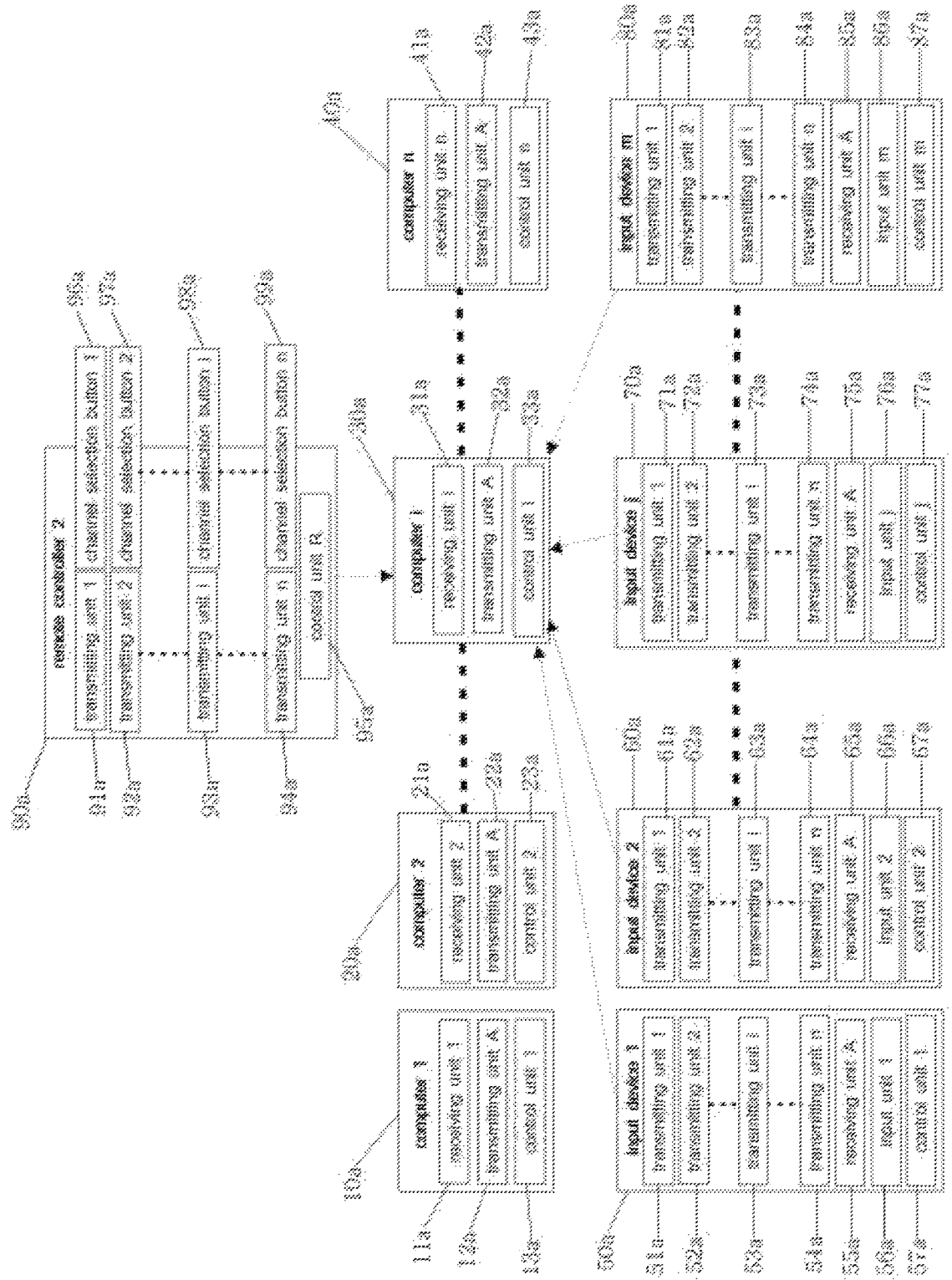
FIG. 7 is a bidirectional block diagram of the method that differentiates the frequency among the methods that enable the equipment desired by the user among the multiple computers to be manipulated with the multiple input devices according to the present invention.
Figure 8:
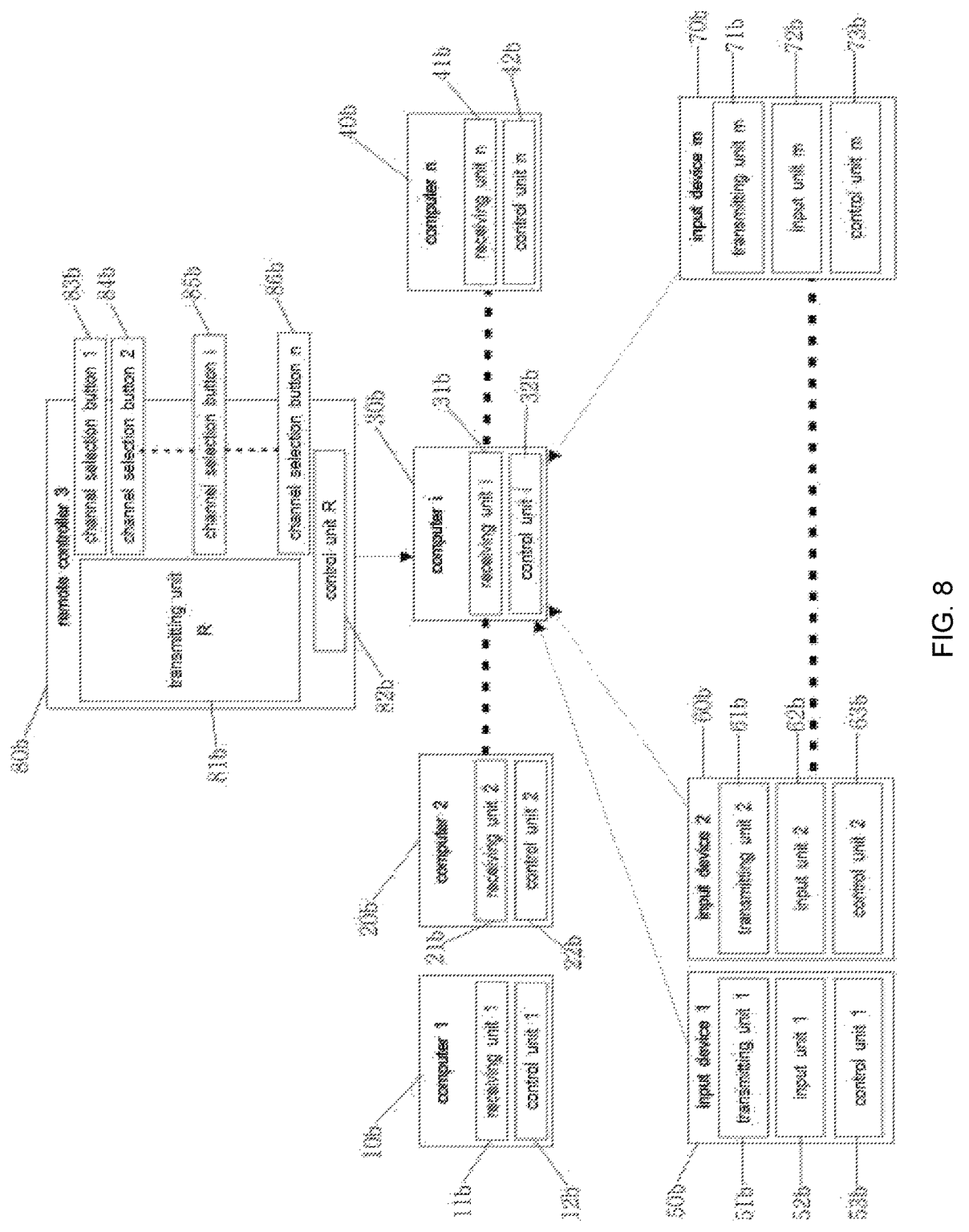
Figure 9:
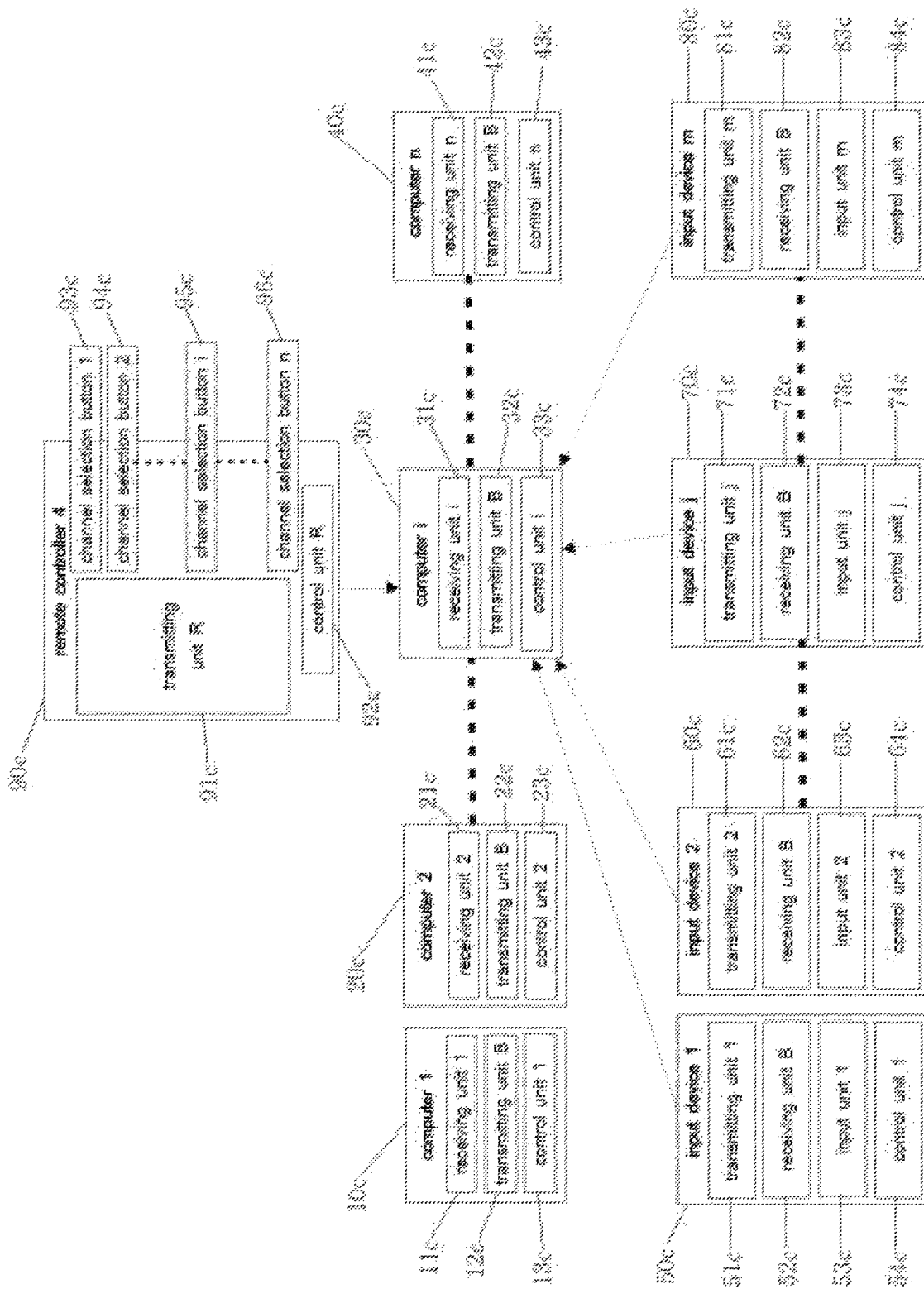
FIG. 9 a bidirectional block diagram of the method that divides the channel at the same frequency among the methods that enable the equipment desired by the user among the multiple computers to be manipulated with the multiple input devices according to the present invention.

FIG. 6 is a unidirectional block diagram of a method that differentiates the frequency among methods that enable an equipment desired by the user among multiple computers to be manipulated with multiple input devices according to the present invention, FIG. 7 is a bidirectional block diagram of the method that differentiates the frequency among the methods that enable the equipment desired by the user among the multiple computers to be manipulated with the multiple input devices according to the present invention, FIG. 8 is a unidirectional block diagram of a method that divides the channel at the same frequency among the methods that enable the equipment desired by the user among the multiple computers to be manipulated with the multiple input devices according to the present invention, and FIG. 9 a bidirectional block diagram of the method that divides the channel at the same frequency among the methods that enable the equipment desired by the user among the multiple computers to be manipulated with the multiple input devices according to the present invention.

FIGS. 6 to 9 are the block diagrams of a method in which the user selects the desired computer by using the channel selection button among n computers and manipulates the selected computer with m input devices.

In the drawings, for simplifying the description, the channel selection button is separately separated and a receiver for wireless input devices is embedded in each computer, and as a result, a term called the "receiver" is omitted and the receiving unit, the transmitting unit, and the control unit displayed in n respective computers are the modules installed in the receiver. In addition, it is assumed that a remote controller corresponds to the mouse and the input device corresponds to the keyboard.

In FIG. 6, the number of computers is n, one receiving unit in which the frequency channels are different from each other is provided in each computer, and a control unit is provided, which controls the input signal processing and the corresponding receiving unit.

The number of input devices is m, n transmitting units having different frequency channels are provided in each input device, an input unit is provided, which takes charge of the input, and a control unit is provided, which controls the input/output signal processing and the corresponding modules inside each input device.

A remote controller 1 80 as a tool that connects m input devices to a computer which the user intends to use among the n computers includes n transmitting units having different frequency channels in each, n channel selection buttons to select the channel, and a control unit R 85 that controls the input signal processing and the modules in the remote controller 1 80.

A receiving unit 1 11 of a computer 1 10, a transmitting unit 1 81 of the remote controller 1 80, and a transmitting unit 1 in each of m input devices have the same frequency channel, a receiving unit 2 21 of a computer 2 20, a transmitting unit 2 82 of the remote controller 1 80, and a transmitting unit 2 in each of m input devices have the same frequency channel, a receiving unit n 41 of a computer n 40, a transmitting unit n 84 of the remote controller 1 80, and a transmitting unit n in each of m input devices have the same frequency channel, a receiving unit i 31 of a arbitrary computer i 30, a arbitrary transmitting unit i 83 of the remote controller 1 80, and a arbitrary transmitting unit i in each of m input devices have the same frequency channel.

Herein, in the contents, in the computer i, the transmitting unit i, the receiving unit i, the control unit i, and the channel selection button i, i means "arbitrary" or "a arbitrary number" and is commonly used in FIGS. 6, 7, 8, and 9.

When a arbitrary channel selection button i 88 in the remote controller 1 80 is pressed, a control unit R 85 of the remote controller 1 80 performs the following process.

In process 13, the transmitting unit i 83 of the remote controller 1 80 transmits the "activation" signal to the receiving unit i 31 of the computer i 30 and in the process 13, when the control unit i 32 of the computer i 30 that receives the "activation" signal through the receiving unit i 31 of the computer i 30 receives the input signals from m input devices, the control unit i 32 of the computer i 30 transmits the input signals to the computer i 30.

In process 14, each transmitting unit of the remote controller 1 80 except for the transmitting unit i 83 of the remote controller 1 80 transmits the "deactivation" signal to the corresponding receiving units of each computer and in the process 14, the corresponding control units that receives the "deactivation" command signals from the corresponding receiving units of each computer disregard each input signals which is received from each of m input devices.

In the status, when the respective signal inputs are received from m input devices, only the computer i 30 operates.

In order to assist understanding, for example, when the contents are simply described, when the user presses a channel selection button 1 87 of the remote controller 1 80 in order to use the computer 2 20, the transmitting unit 1 82 of the remote controller 1 80 transmits the "activation" signal to the receiving unit 2 21 of the computer 2 20 and transmitting units other than the transmitting unit 2 82 of the remote controller 1 80 transmit the "deactivation" signals to the receiving units of the corresponding computers. In the status, when the user uses an input device 1 50 and an input device 2 60, only the computer 2 20 operates.

In FIG. 7, the number of computers is n, one receiving unit in which the frequency channels are different from each other is provided in each computer, one transmitting unit A of the same frequency channel is provided, and a control unit is provided, which controls the input/output signal processing and the corresponding receiving unit and transmitting unit A.

The number of input devices is m, n transmitting units having different frequency channels are provided in each input device, one receiving unit A having the same frequency channel is provided, an input unit is provided, which takes charge of the input, and a control unit is provided, which controls the input signal processing and the corresponding transmitting units and receiving unit A.

A remote controller 2 90a as a tool that connects m input devices to a computer which the user intends to use among the n computers includes n transmitting units having different frequency channels in each, n channel selection buttons to select the channel, and a control unit R 95a that controls the input signal processing and the modules in the remote controller 2 90a.

A receiving unit 1 11a of a computer 1 10a, a transmitting unit 1 91a of the remote controller 2 90a, and a transmitting unit 1 in each of m input devices have the same frequency channel, a receiving unit 2 21a of a computer 2 20a, a transmitting unit 2 92a of the remote controller 2 90a, and a transmitting unit 2 in each of m input devices have the same frequency channel, a receiving unit n 41a of a computer n 40a, a transmitting unit n 94a of the remote controller 2 90a, and a transmitting unit n in each of m input devices have the same frequency channel, a receiving unit i 31a of a arbitrary computer i 30a, a arbitrary transmitting unit i 93a of the remote controller 2 90a, and a arbitrary transmitting unit i in each of m input devices have the same frequency channel, and the transmitting unit A of each of n computers has the same frequency channel as the receiving unit A in each of m input devices.

When a arbitrary channel selection button i 98*a* in the remote controller 2 90*a* is pressed, a control unit R 95*a* of the remote controller 2 90*a* performs the following process.

In process 15, the transmitting unit i 93*a* of the remote controller 2 90*a* transmits the "activation" signal to the receiving unit i 31*a* of the computer i 30*a* and in the process 15, when the control unit i 33*a* of the computer i 30*a* that receives the "activation" signal through the receiving unit i 31*a* of the computer i 30*a* receives the input signals from m input devices, the control unit i 33*a* of the computer i 30*a* transmits the input signals to the computer i 30*a*.

In process 16, each transmitting unit of the remote controller 2 90*a* except for the transmitting unit i 93*a* of the remote controller 2 90*a* transmits the "deactivation" signal to the corresponding receiving units of each computer and in the process 16, the corresponding control units that receives the "deactivation" command signals from the corresponding receiving units of each computer disregard each input signals which is received from each of m input devices.

In the status, when the respective signal inputs are received from m input devices, only the computer i 30*a* operates.

In the status, when the user inputs the signal by using a arbitrary input device j 70*a*, a control unit j 77*a* of the input device j 70*a* transmits the input signal to the receiving unit i 31*a* of the computer i 30*a* through a transmitting unit i 73*a* and the control unit i 33*a* of the computer i 30*a* transmits the input signal received by the receiving unit i 31*a* to the computer i 30*a*. The computer i 30*a* verifies and executes an ID to recognize which input device transmits the received input signal. When the input signal executed and processed by the computer i 30*a* is a signal to request a feedback of the input device j 70*a*, the control unit i 33*a* transmits the signal executed and processed by the computer i 30*a* to a receiving unit A 75*a* of the input device j 70*a* through a transmitting unit A 32*a* and the corresponding control unit j 77*a* executes and processes the corresponding signal and thereafter, retransmits the executed and processed signal to the computer i 30*a*.

Herein, in the contents, in the input device j, the input unit j, and the control unit j, j means arbitrary and is commonly used in FIGS. 7 and 9.

In FIG. 8, the number of computers is n, one receiving unit having the same frequency is provided in each computer, and a control unit is provided, which controls the input/output signal processing and the corresponding receiving unit.

The number of input devices is m, one transmitting unit having the same frequency is provided in each input device, an input unit taking charge of the input is provided, and a control unit is provided, which controls the input/output signal processing and the corresponding modules inside each input device.

A remote controller 3 80*b* as a tool that connects m input devices to the computer which the user intends to use among the n computers includes a transmitting unit R 81*b*, n channel selection buttons to select the channel, and a control unit R 82*b* that controls the input signal processing and the modules in the remote controller 3 80*b*.

The receiving units of n respective computers use the same frequency as a transmitting unit R 81*b* of the remote controller 3 80*b* and the transmitting unit in each of m input devices.

When a arbitrary channel selection button i 85*b* in the remote controller 3 80*b* is pressed, the control unit R 82*b* of the remote controller 3 80*b* transmits an "activation of computer i" signal to the receiving units of n computers through the transmitting unit R 81*b* of the remote controller 3 80*b* and when a control unit i 33*b* of the computer i 30*b* that receives the "activation of computer i" signal through the receiving unit i 31*b* of the computer i 30*b* receives the input signals from m input devices, the control unit i 33*b* transmits the received input signals to the computer i 30*b*.

A control unit of another computer other than the computer i 30*b* among n computers also receives the "activation of computer i" signal through the corresponding receiving unit, but since the "activation of computer i" signal is not an "activation of the control unit itself" signal, the control unit processes the "deactivation" command signal and disregards the input signals received from m input devices.

In the state, when the respective signal inputs are received from m input devices, only the computer i 30*b* operates.

In the contents, when each control unit of n computers receive a signal which is not "activation of the control unit itself" signal in signal generated by the channel selection button, the control unit handles with "deactivation" command.

In FIG. 9, the number of computers is n, one receiving unit having the same frequency is provided in each computer, one transmitting unit B of the same frequency channel is provided, and a control unit is provided, which controls the input/output signal processing and the corresponding receiving unit and transmitting unit B.

The number of input devices is m, one transmitting unit having the same frequency is provided in each input device, one receiving unit B having the same frequency channel is provided, an input unit is provided, which takes charge of the input, and a control unit is provided, which controls the input signal processing and the corresponding transmitting unit and receiving unit B.

A remote controller 4 90*c* as a tool that connects m input devices to the computer which the user intends to use among the n computers includes a transmitting unit R 91*c*, n channel selection buttons to select the channel, and a control unit R 92*c* that controls the input signal processing and the modules in the remote controller 4 90*c*.

The receiving units of n respective computers use the same frequency as a transmitting unit R 91*c* of the remote controller 4 90*c* and the transmitting unit in each of m input devices and the transmitting unit B of each of n computers uses the same frequency channel as the receiving unit B in each of m input devices.

When a arbitrary channel selection button i 95*c* in the remote controller 4 90*c* is pressed, the control unit R 92*c* of the remote controller 4 90*c* transmits an "activation of computer i" signal to the receiving units of n computers through the transmitting unit R 91*c* of the remote controller 4 90*c* and when a control unit i 33*c* of the computer i 30*c* that receives the "activation of computer i" signal through the receiving unit i 31*c* of the computer i 30*c* receives the input signals from m input devices, the control unit i 33*c* transmits the received input signals to the computer i 30*c*.

A control unit of another computer other than the computer i 30*c* among n computers also receives the "activation of computer i" signal through the corresponding receiving unit, but since the "activation of computer i" signal is not an "activation of the control unit itself" signal, the control unit processes the "deactivation" command signal and disregards the input signals received from m input devices.

In the state, when the respective signal inputs are received from m input devices, only the computer i 30*c* operates.

In the contents, when each control unit of n computers receive a signal which is not "activation of the control unit itself" signal in signal generated by the channel selection button, the control unit handles with "deactivation" command.

In the status, when the user inputs the signal by using a arbitrary input device j 70c, a control unit j 74c of the input device j 70c transmits the input signal to the receiving unit i 31c of the computer i 30c through a transmitting unit i 71c and the control unit i 33c of the computer i 30c transmits the input signal received by the receiving unit i 31c to the computer i 30c. The computer i 30c verifies and executes an ID to recognize which input device transmits the received input signal. When the input signal executed and processed by the computer i 30c is a signal to request a feedback of the input device j 70c, the control unit i 33c transmits the signal executed and processed by the computer i 30c to a receiving unit B 72c of the input device j 70c through a transmitting unit B 32c and the corresponding control unit j 74c executes and processes the corresponding signal and thereafter, retransmits the executed and processed signal to the computer i 30c.

In the contents of the present invention, since unidirectional and bidirectional input devices of a scheme that uses respective different frequencies and a scheme that divides the channels of the same frequency operate independently from each other, the "Sleep Mode" in non-use and the "WakeUp Mode" in use are available and the battery may be thus used for a long time and multiple input devices may be used in the computer desired by the user among multiple computers by the channel selection button.

The scheme that differentiates the frequency and the scheme that divides the channels at the frequency may be applied to Internet of Things or a wearable device and applied even to a smart device such as a smart phone or a smart pad.

The two schemes have advantages and disadvantages and when only the disadvantages are described, since a lot of transmitting units and receiving units having different frequencies need to be used in the frequency channel scheme, the number of controlled computers increases, and as a result, it may be complicated in implementing the frequency division scheme and there is a limit in channels which may be divided at the same frequency in the channel division scheme. Those skilled in the art may jointly use both schemes by considering the advantages and disadvantages.

The channel selection button of the remote controller mentioned in FIGS. 6, 7, 8, and 9 of the present invention for easy description may be inserted into a arbitrary computer among n computers and inserted into a arbitrary input device among m input devices.

In addition, n computers and m input devices which are terms mentioned in FIGS. 6, 7, 8, and 9 are limitedly described for easy description, but the computers may be implemented by n different systems or equipments and the input devices may be implemented even by m different types of input/output devices.

As described above, detailed exemplary embodiments have been described in the detailed description of the present invention, but a possibility that the technology of the present invention will be easily modified and executed by those skilled in the art is apparent and the modified exemplary embodiments will be included in the technical spirit disclosed in the appended claims of the present invention.

What is claimed is:

1. A kit for controlling multiple computers, comprising:
   $1^{st}$ to $n^{th}$ computers, wherein n is at least 2;
   $1^{st}$ to $m^{th}$ input devices, wherein m is at least 2; and
   one remote controller,
   wherein each of the $1^{st}$ to $n^{th}$ computers includes: a receiving unit having a frequency channel; and a control unit for controlling processing of an input signal and the receiving unit,
   each of the $1^{st}$ to $m^{th}$ input devices includes $1^{st}$ to $n^{th}$ transmitting units having different frequency channels, an input unit, and a control unit for controlling processing of an input/output signal and modules in the each input device,
   the remote controller includes $1^{st}$ to $n^{th}$ transmitting units having different frequency channels, $1^{st}$ to $n^{th}$ channel selection buttons to select channels, and a control unit for controlling processing an input signal and modules in the remote controller, and
   each of the $1^{st}$ to $n^{th}$ computers is communicatively coupled to the $1^{st}$ to $m^{th}$ input devices by the remote controller, wherein the receiving unit of an $i^{th}$ computer among the $1^{st}$ to $n^{th}$ computers, an $i^{th}$ transmitting unit among the $1^{st}$ to $n^{th}$ of the transmitting units of the remote controller, and an $i^{th}$ transmitting units among the $1^{st}$ to $n^{th}$ transmitting units in each of the $1^{st}$ to $m^{th}$ input devices use a same frequency channel,
   wherein, responsive to a user selection of $i^{th}$ channel selection button of the remote controller, the kit is configured to perform the following processes:
   in process 1, the $i^{th}$ transmitting unit of the remote controller transmits an activation command to the receiving unit of the $i^{th}$ computer,
   in process 2, when the receiving unit of the $i^{th}$ computer receives the activation command, the control unit of the $i^{th}$ computer causes the receiving unit of the $i^{th}$ computer to receive input signals from the $1^{st}$ to $m^{th}$ input devices,
   in process 3, all of the $1^{st}$ to $n^{th}$ transmitting units, except the $i^{th}$ transmitting unit, of the remote controller transmit a deactivation command to the receiving units of corresponding computers, and
   in process 4, the control unit of each computer that receives the deactivation command from the remote controller in the process 3 disregards the input signals received from $1^{st}$ to $m^{th}$ input devices,
   wherein, responsive to the input signals received from $1^{st}$ to $m^{th}$ input devices, only the $i^{th}$ computer operates to process the input signals, and
   wherein the $1^{st}$ to $m^{th}$ input devices operate independently from each other and operate in a wakeup mode when in use and in a sleep mode when in not use.

2. A kit for controlling multiple computers as recited in claim 1, wherein, in the process 2, when a user inputs the input signals by use of a $j^{th}$ input device among the $1^{st}$ to $m^{th}$ input devices, the control unit of the $i^{th}$ computer processes the input signals, j is a positive integer and different from i, and wherein each of the $1^{st}$ to $n^{th}$ computers further include a transmitting unit and wherein each of the $1^{st}$ to $m^{th}$ input device further includes a receiving unit and wherein the kit is further configured to perform the following processes:
   in process 21, the control unit of the $j^{th}$ input device transfers an input command of the user to the receiving unit of the $i^{th}$ computer,
   in process 22, the receiving unit of the $i^{th}$ computer receives the input command,
   in process 23, the $i^{th}$ computer determines from which input device the input command is sent and verifies that the input command is sent from the $j^{th}$ input device and thereafter, executes the input command, and
   in process 24, when the input command executed by the $i^{th}$ computer is a request for a feedback to the $j^{th}$ input device, the control unit of the $i^{th}$ computer transmits a signal to the receiving unit of the $j^{th}$ input device through the transmitting unit of the $i^{th}$ computer, the control unit of the $j^{th}$ input device processes the signal received from the $i^{th}$ computer and thereafter, retransmits the processed signal to the $i^{th}$ computer.

3. A kit for controlling multiple computers, comprising:
$1^{st}$ to $n^{th}$ computers, wherein n is at least 2;
$1^{st}$ to $m^{th}$ input devices, wherein m is at least 2; and
one remote controller,
wherein each of the $1^{st}$ to $n^{th}$ computers includes a receiving unit and a control unit for controlling processing an input command signal and the receiving unit of the each computer, the receiving units of the $1^{st}$ to $n^{th}$ computers use a same frequency channel,
each of the $1^{st}$ to $m^{th}$ input devices includes a transmitting unit, an input unit, and a control unit for controlling processing an input/output signal and modules of the each input device, the receiving units of the $1^{st}$ to $m^{th}$ input devices use a same frequency channel,
the remote controller includes a transmitting unit, $1^{st}$ to $n^{th}$ channel selection buttons, and a control unit for controlling processing an input signal and modules in the remote controller,
the receiving units of the $1^{st}$ to $n^{th}$ computers, the transmitting unit of the remote controller, and the transmitting units in $1^{st}$ to $m^{th}$ input devices use a same frequency channel, and
an $i^{th}$ computer among the $1^{st}$ to $n^{th}$ computers is communicatively coupled to the $1^{st}$ to $m^{th}$ input devices through the remote controller,
wherein, when a user presses an $i^{th}$ channel selection button among the $1^{st}$ to $n^{th}$ channel selection buttons, the kit is configured to execute the following processes,
in process 1, the control unit of the remote controller transmits an activation command for activating the $i^{th}$ computer to the receiving units of the $1^{st}$ to $n^{th}$ computers through the transmitting unit of the remote controller,
in process 2, when the control unit of the $i^{th}$ computer receives input signals from the $1^{st}$ to $m^{th}$ input devices, the control unit of the $i^{th}$ computer processes the input signals,
in process 3, all of the control units of the $1^{st}$ to $n^{th}$ computers except the $i^{th}$ computer receive the activation command, and
in process 4, the control unit of each computer that receives the activation command in the process 3 recognizes the activation command as a deactivation command and disregards the input signals received from the $1^{st}$ to $m^{th}$ input devices,
wherein, when the input signals from $1^{st}$ to $m^{th}$ input devices are received, only the $i^{th}$ computer operates to process the input signals, and
wherein the $1^{st}$ to $m^{th}$ input devices operate independently from each other and operate in a wakeup mode when in use and in a sleep mode when in not use.

4. A kit for controlling multiple computers as recited in claim 3, wherein, in the process 2, when a user inputs the input signals by use of a $j^{th}$ input device among the $1^{st}$ to $m^{th}$ input devices, the control unit of the $i^{th}$ computer processes the input signals, j is a positive integer and different from i, and wherein each of the $1^{st}$ to $n^{th}$ computers further include a transmitting unit and wherein each of the $1^{st}$ to $m^{th}$ input device further includes a receiving unit and wherein the kit is further configured to perform the following processes:
in process 21, the control unit of the $j^{th}$ input device transfers an input command of the user to the receiving unit of the $i^{th}$ computer,
in process 22, the receiving unit of the $i^{th}$ computer receives the input command,
in process 23, the $i^{th}$ computer determines from which input device the input command is sent and verifies that the input command is sent from the $j^{th}$ input device and thereafter, executes the input command, and
in process 24, when the input command executed by the $i^{th}$ computer is a request for a feedback to the $j^{th}$ input device, the control unit of the $i^{th}$ computer transmits a signal to a receiving unit of the $j^{th}$ input device through the transmitting unit of the $i^{th}$ computer, the control unit of the $j^{th}$ input device processes the signal received from the $i^{th}$ computer and thereafter, retransmits the processed signal to the $i^{th}$ computer.

* * * * *